(No Model.)
T. H. JACOBS.
METHOD OF CONVERTING MESQUITE BEANS.
No. 479,512. Patented July 26, 1892.
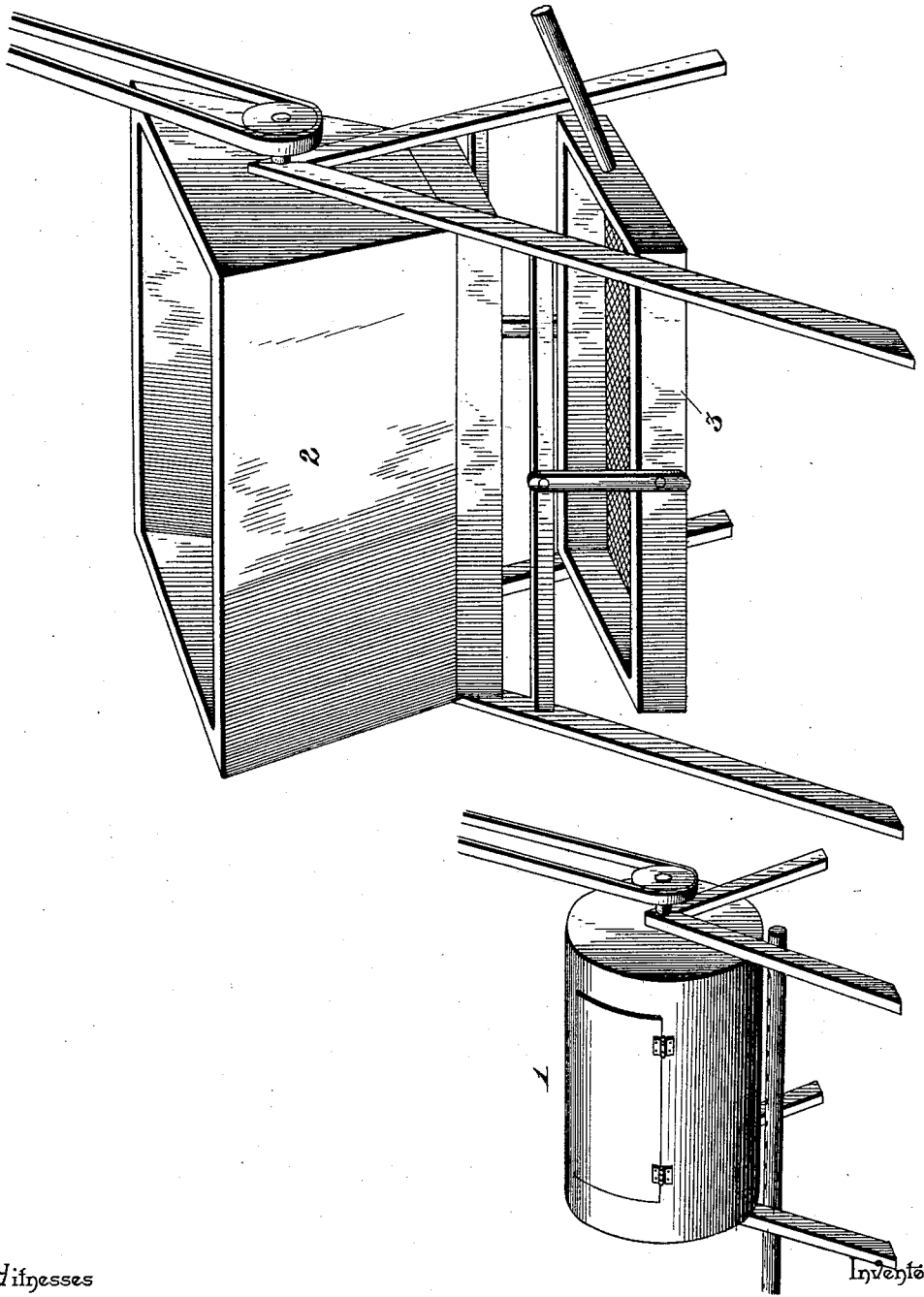
Witnesses
Chas. A. Ford
John H. Siggers
By his Attorneys,
C. A. Snow & Co.
Inventor
Thomas H. Jacobs

UNITED STATES PATENT OFFICE.

THOMAS H. JACOBS, OF SAN ANTONIO, TEXAS.

METHOD OF CONVERTING MESQUITE-BEANS.

SPECIFICATION forming part of Letters Patent No. 479,512, dated July 26, 1892.

Application filed February 16, 1892. Serial No. 421,737. (No model.)

*To all whom it may concern:*

Be it known that I, THOMAS H. JACOBS, a citizen of the United States, residing at San Antonio, in the county of Bexar and State of Texas, have invented a new and useful Method of Converting Mesquite-Beans, of which the following is a specification.

My invention relates to a new and improved method of treating mesquite-beans, whereby they are converted into a healthful easily-digestible article of food either for man or beast, or may be infused in liquid for producing a healthful agreeable drink. The mesquite-tree, as is well known, is particularly luxuriant in the southern portions of the United States, and though the bean which it yearly produces has been to some extent used as an edible in the crude state by animals and in a powdered state as mush by the natives, yet, notwithstanding these facts and the evident nutrition it posseses, there has been discovered certain characteristics of the bean or portions thereof which are not only unnutritious, but absolutely unwholesome. By crushing the pod or shell I have found that the product of the mesquite-tree consists of a series of small beans about the size of half a pea, which are inclosed in a tough pod, fibrous in its nature, and it in turn is inclosed in an outer more brittle shell. This pod, tough and fibrous as it is, is the indigestible non-nutritious part of the product, the beans and outer shell being nutritious and wholesome. Animals have heretofore eaten the product as it dropped from the trees, the indigestibility of the pod portion readily manifesting itself upon them. The natives have pounded the product, reducing it to a pulp-like substance, from which they made mush, in which the fibrous indigestible pod was present.

My method or process consists, therefore, in eradicating from this product all unnutritious unwholesome properties and rendering the same capable of being ground to a fine powder in an ordinary mill, whereby I produce, after suitable bolting or refining, a cheap, wholesome meal that is readily digested by the most delicate stomach and which may be formed into cakes for storing or transporting or stored or transported in its loose state to be subsequently eaten as mush, infused into liquid to form a beverage, or made into a bread-like substance.

Various means may be provided for carrying out my invention, and I will now proceed to describe one simple way of practicing the same.

In the drawing I have illustrated one form of machine capable of practicing my invention. 1 designates an ordinary roaster, 2 a crusher, and 3 a bolter or screen.

The product is first naturally or artificially dried, as may be most expedient, until the moisture is absorbed therefrom, after which it is broken into small pieces or products by hand or otherwise. If desired, I may at this point roast the same to still further increase its brittleness. The mass is now placed in an ordinary mill and ground, so far as may be, to a fine powder, the sinuous pulp which formerly constituted the pod being of course to some extent disintegrated, but yet remaining in its unwholesome form in the powder or meal. When this has been accomplished, the mealy or powdered mass is submitted to one or a series of bolting operations, the bolting-cloth being sufficiently fine to exclude the fiber, which formerly constituted the pod. That portion which falls through the bolting-cloth is ready for use in making the beverage before mentioned, mush, bread, &c., or may be packed for storage or transportation. The residue or tailings may now be reground for the purpose of reducing any nutritious portions of the product that were not sufficiently fine to pass through the bolting-cloth and a rebolting takes place the sinuous fibrous qualities of the mass being excluded by the bolting-cloth or rejected, while the meal or powder will escape through the meshes thereof. By continuing this process of grinding and bolting all nutritious properties of the product and heretofore constituting the bean and outer shell are finally reduced to a powdered or mealy state, ready for consumption in any of the various ways which may be devised.

From the foregoing description it will be seen that I have taken a natural product having certain good and bad qualities which have heretofore been jointly used and have refined the product so that the bad qualities have been extracted and the good ones reduced to a wholesome pleasant-tasting food, capable of being employed as a drink, bread, or mush. Though the product may be employed as food, yet it is especially intended to be employed in making a beverage to be used in lieu of coffee. Some of the good qualities of the latter it has been found to possess.

Having described my invention, what I claim is—

The herein-described method of producing flour from the mesquite-bean, which consists first, in a preliminary drying of the bean as a whole to eradicate moisture; second, breaking the thus-dried bean into short pieces to render it more readily affected by the heat and uniformly roasted; third, roasting the broken particles to render friable or more brittle; fourth, grinding the mass, and, fifth, separating the powdered bean and outer pod from the hull, these steps being carried out in the order named, substantially as and for purpose specified.

In testimony that I claim the foregoing as my own I have hereto affixed my signature in the presence of two witnesses.

THOMAS H. JACOBS.

Witnesses:
J. H. SIGGERS,
H. G. PIERSON.